US008180227B2

(12) United States Patent
Liu et al.

(10) Patent No.: US 8,180,227 B2
(45) Date of Patent: May 15, 2012

(54) DIGITAL COHERENT DETECTION OF MULTI-CARRIER OPTICAL SIGNAL

(75) Inventors: Xiang Liu, Marlboro, NJ (US); Chandrasekhar Sethumadhavan, Old Bridge, NJ (US); Robert William Tkach, Little Silver, NJ (US)

(73) Assignee: Alcatel Lucent, Paris (FR)

( * ) Notice: Subject to any disclaimer, the term of this patent is extended or adjusted under 35 U.S.C. 154(b) by 416 days.

(21) Appl. No.: 12/565,600

(22) Filed: Sep. 23, 2009

(65) Prior Publication Data
US 2011/0069975 A1    Mar. 24, 2011

(51) Int. Cl.
*H04B 10/06* (2006.01)
(52) U.S. Cl. ...................................................... 398/203
(58) Field of Classification Search ........... 398/202–203
See application file for complete search history.

(56) References Cited

U.S. PATENT DOCUMENTS
2004/0114939 A1    6/2004  Taylor
2011/0002689 A1*   1/2011  Sano et al. .................. 398/44

FOREIGN PATENT DOCUMENTS
WO  PCT/US2010/049019    12/2010

OTHER PUBLICATIONS

Akihide Sano et al., "No-Guard-Interval coherent Optical OFDM for 100-Gb/s Long-Haul WDM Transmission," *Journal of Lightwave Technology*, vol. 27, pp. 3705-3713 (2009).
Yamada, E. et al: "1 Tbit/s (111Gbit/s/ch x 10 ch) no-guard-interval CO-OFDM transmission over 2100 km DSF", Electronics Letters, vol. 44, No. 24, Nov. 20, 2008, 2 pgs.
Sano, Akihide et al: "No-Guard-Interval Coherent Optical OFDM for 100-Gb/s Long-Haul WDM Transmission", Journal of Lightwave Technology, vol. 27, No. 16, Aug. 15, 2009, pp. 3705-3713.

* cited by examiner

*Primary Examiner* — Shi K Li
(74) *Attorney, Agent, or Firm* — D. M. La Bruno

(57) ABSTRACT

Embodiments for optical communication are provided in which subbands of a multi-carrier optical signal are digital coherent detected and then processed to recover data carried by the modulated carriers corresponding to at least one of the subbands. An exemplary optical communication system includes a multi-carrier coherent optical receiver for receiving a multi-carrier optical signal having M modulated carriers that are frequency locked, wherein M is greater than 2. The multi-carrier coherent optical receiver includes a subband digital coherent detector configured to provide output signals in a digital form for N different subbands of the multi-carrier optical signal, where N is an integer greater than 1 and less than M; and a digital signal processor configured to process the digital form of the detected output signals in order to recover the data carried by the modulated carriers corresponding to at least one of the subbands of the multicarrier optical signal.

20 Claims, 3 Drawing Sheets

(A) m=2, (N=M/2)

M/2 OLOs (B) m=3, (N=M/3)

M/3 OLOs (C) m=4, (N=M/4)

M/4 OLOs

DIGITAL COHERENT DETECTION OF MULTI-CARRIER OPTICAL SIGNAL

FIELD OF THE INVENTION

The invention relates to optical transmission systems, and, in particular, to systems, apparatuses and techniques for digital coherent detection of a multi-carrier optical signal.

BACKGROUND INFORMATION

Chromatic dispersion (CD) is a deterministic distortion given by the design of the optical fiber. It leads to a frequency dependence of the optical phase and its effect on transmitted signal scales quadratically with the bandwidth consumption or equivalently the data rate. Therefore, CD tolerances are reduced to 1/16, if the data rate of a signal is increased by a factor of four (4). Up to a 2.5 Gb/s data rate optical data transmission is feasible without any compensation of CD even at long haul distances. At 10 Gb/s, the consideration of chromatic dispersion becomes necessary, and dispersion compensating fibers (DCF) are often used. At 40 Gb/s and beyond, even after the application of DCF the residual CD may still be too large for feasible optical communication.

Another transmission impairment experienced in optical transmission, for example in coherent optical orthogonal frequency-division multiplexing (CO-OFDM) systems, is Polarization-Mode Dispersion (PMD), which is a stochastic characteristic of optical fiber due to imperfections in production and installation. Pre-1990 fibers exhibit high PMD values well above 0.1 ps/√km which are border line even for 10 Gb/s. Newer fibers have a PMD lower than 0.1 ps/√km, but other optical components in a fiber link such as reconfigurable add/drop multiplexers (ROADMs) may cause substantial PMD. If 40 Gb/s systems are to be operated over the older fiber links or over new fiber links with many ROADMs, PMD may become a significant detriment.

PMD can be compensated by optical elements with an inverse transmission characteristics to the fiber. However, due to the statistical nature of PMD with fast variation speeds up to the few kHz range, the realization of optical PMD compensators is challenging. With increases in channel data rate, optical signal is more and more limited by the transmission impairments in optical fiber, such as by CD and PMD.

Thus, digital coherent detection is considered as a promising technique for future high-speed optical transmission because of its high receiver sensitivity and capability to compensate for transmission impairments such as chromatic dispersion (CD) and polarization-mode dispersion (PMD), which critically impact the performance of high-speed transmission. While 100-Gb/s Ethernet is currently being researched and developed for next-generation optical transport systems, Terabit/s Ethernet has already been mentioned as a future direction for optical transport systems.

SUMMARY OF THE INFORMATION

The limitations of system elements present several obstacles for the development of future optical transmission systems utilizing digital coherent detection. For example, a key component needed for digital coherent detection is the electronic analog-to-digital converter (ADC). The sampling speed of the ADC used in recent research demonstrations is usually 50 Gsamples/s, and the sampling speed of an ADC is expected to be limited to well below 100 Gsamples/s for the foreseeable future. Also, the optical modulator and modulator driver bandwidth is currently limited to be well below 100 GHz. As a result, these sampling limitations cause an electronic bottleneck for realizing ultrahigh-speed (e.g., ≧400 Gb/s) single-channel transmission.

It has been proposed to address the electronic bottleneck by generating a multi-carrier no-guard-interval coherent optical orthogonal frequency-division multiplexing (No-GI-CO-OFDM) signal, which permits a reduction in the bandwidth requirement on the modulator and modulator driver by using multiple modulators. Use of No-GI-OFDM also slightly reduces the spectral bandwidth of the signal as compared to conventional CO-OFDM that requires GI, and thus relaxes the bandwidth requirement on the ADC.

However, to receive, for example, a 1-Tb/s multi-carrier channel with the popular polarization-division multiplexed quadrature phase-shift keying (PDM-QPSK) modulation for carrier modulation with a single digital coherent receiver, the required ADC sampling speed needs to be larger than 250 Gsamples/s, which is too high to be implemented in the foreseeable future.

Embodiments of the invention address the electronic bottleneck using a multiplexing and detection methodology. An ultrahigh-speed multi-carrier signal including M (M being an integer that is larger than 2) modulated carriers, each having a modulation symbol rate of Rs, and under, for example, the orthogonal frequency-division multiplexing (OFDM) condition is transmitted to a receiver. In this context, by "ultrahigh-speed" is meant a multi-carrier optical signal speed that can not be captured by single digital coherent receiver due to limitations of ADC sampling speed. For example, an ultrahigh-speed multi-carrier signal may have a speed of ≧400 Gb/s or ≧1-Tb/s.

The receiver detects m (2≦m<M) modulated carriers a time through subband digital coherent detection with ADC sampling speed $R_{ADC}$ of about (m+1)Rs, and performs carrier separation and data recovery through digital signal processing (DSP). Proper anti-aliasing filtering may be performed prior to the ADC sampling. With such an arrangement, the necessary ADC sampling speed may be reduced by a factor of m/M without large coherent crosstalk from adjacent subbands. In addition, the simultaneous detection of at least two (2) carriers per subband increases the efficiency of the DSP needed for carrier recovery as the effective oversampling factor, defined as the ratio between the sampling rate and the signal modulation symbol rate, scales as (m+1)/m. For example, the oversampling factor for the case where only one carrier is detected at a time is 2, and it is reduced to 1.33 when m=3. Also, the receiver optical complexity is reduced when more carriers are detected per digital sampling.

System, method and apparatus embodiments are provided for efficient digital coherent detection of ultrahigh-speed multi-carrier optical signals. Embodiments of the invention enable ultrahigh-speed (e.g., 1-Tb/s) digital coherent detection with much relaxed sampling speed requirement on ADC and high DSP efficiency. Exemplary embodiments include steps and structure to perform subband digital coherent detection and processing of detected digital signals in order to recover data carried by the modulated carriers in a subband of a multi-carrier optical signal.

An exemplary optical communication system according to the invention includes a multi-carrier coherent optical receiver for receiving a multi-carrier optical signal having M modulated carriers that are frequency locked, wherein M is greater than two (2). The multi-carrier coherent optical receiver includes a subband digital coherent detector configured to provide output signals in a digital form for N different subbands of the multi-carrier optical signal, where N is an integer greater than 1 and less than M; and a digital signal processor configured to process the digital form of the detected output signals in order to recover the data carried by the modulated carriers corresponding to at least one of the subbands of the multi-carrier optical signal.

In one embodiment, the multi-carrier optical signal is a no-guard-interval coherent optical orthogonal frequency-division multiplexing (NGI-CO-OFDM) signal. In one embodiment, the subband digital coherent detector includes a 1:N splitter configured to split the multi-carrier optical signal into a plurality of multi-carrier optical signals; N optical local oscillators having different wavelengths that are approximately centered at the N different subbands of the multi-carrier optical signal; N polarization diversity optical hybrids, each polarization diversity optical hybrid configured to mix one of the split multi-carrier optical signals with a reference source of a corresponding optical local oscillator of the N optical local oscillators; a plurality of photodetectors configured to detect output signals of at least one polarization diversity optical hybrid of the N polarization diversity optical hybrids; and a plurality of analog-to-digital converters (ADC) configured to convert detected output signals from the plurality of photodetectors to digital form.

The N optical local oscillators may be equally spaced in frequency. In one embodiment, a center frequency of the N sidebands is equally spaced. Each of the N subbands may contain at least two modulated carriers in one embodiment. Each subband of the multi-carrier optical signal may have an equal number of modulated carriers. The photodetectors may be balanced detectors, single ended detectors or a combination thereof.

In one embodiment, a plurality of ADC corresponding to a subband have a sampling rate of approximately (m+1)Rs, wherein Rs is a modulation symbol rate of each carrier, and wherein m is the number of modulated carriers covered in the subband of the multi-carrier optical signal. Proper anti-abasing filtering may be performed prior to the ADC sampling:

In one embodiment, the DSP is further configured to compensate for transmission impairments for each subband of the multi-carrier optical OFDM signal separately. These transmission impairments may include CD, PMD, and self-phase modulation (SPM).

In one embodiment, the DSP includes least one of a dispersion compensation module, a constant modulus algorithm (CMA) based blind equalization module, a self-phase modulation (SPM) compensation module, a carrier separation module, a frequency estimation and compensation module, a phase estimation and compensation module, a demodulation module, and a data recovery module for processing at least one subband of the received multi-carrier optical signal.

In one embodiment, the optical communication system also includes a multi-carrier optical transmitter for generating the multi-carrier optical signal provided to the multi-carrier optical receiver. One exemplary multi-carrier optical transmitter includes a multi-carrier generator configured to receive input light and generate M (M>2) frequency-locked optical carriers; a wavelength demultiplexer configured to separate the generated multiple frequency-locked optical carriers; a plurality of modulators configured to synchronously modulate corresponding optical carriers to generate corresponding modulated carriers; and a combiner configured to combine the plurality of corresponding modulated carriers into the multi-carrier optical signal having M modulated carriers with time-aligned symbols.

An exemplary method performed at a receiver includes obtaining a multi-carrier optical signal including M modulated carriers that are frequency locked, wherein M is greater than 2, each modulated carrier having a modulation symbol rate of Rs; detecting a subset of the plurality of modulated carriers through subband digital coherent detection with analog-to-digital (ADC) sampling speed of approximately (m+1) Rs, in being the number of modulated carriers covered in a corresponding subband of the multi-carrier optical signal, the subset of the plurality of modulated carriers including two or more carriers; and processing the subset of carriers jointly to perform carrier separation and recovery.

In one embodiment, detecting a subset of the plurality of modulated carriers includes, for the corresponding subband of the multi-carrier optical signal: mixing the multi-carrier optical signal with a reference source of an optical local oscillator whose frequency is approximately at the center of the corresponding subband to generate a plurality of first output signals; photodetecting the plurality of first output signals; and converting the photodetected plurality of first output signals into digital form. The detecting may be performed for a plurality of subbands of the multi-carrier optical signal, with the optical local oscillator is configured at a different frequency for each subband in order to provide coverage of a portion of the spectrum of the multi-carrier optical signal.

In one embodiment, all of the subbands of the multi-carrier optical signal have an equal number of carriers, e.g., 2, 3, or 4 carriers. In another embodiment, all of the subbands of the multi-carrier optical signal do not have an equal number of carriers.

In one embodiment, the processing a subset of carriers jointly is performed separately for each of a plurality of subbands. Processing the subset may include at least one of dispersion compensation, constant modulus algorithm (CMA) based blind equalization, self-phase modulation (SPM) compensation, carrier separation, frequency estimation and compensation, phase estimation and compensation, demodulation, and data recovery. The multi-carrier optical signal may be an ultrahigh-speed (e.g., 1-Tb/s) signal.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein.

DETAILED DESCRIPTION

Various example embodiments will now be described more fully with reference to the accompanying figures, it being noted that specific structural and functional details disclosed herein are merely representative for purposes of describing example embodiments. Example embodiments may be embodied in many alternate forms and should not be construed as limited to only the embodiments set forth herein.

It will be understood that, although the terms first, second, etc. may be used herein to describe various elements, these elements should not be limited by these terms since such terms are only used to distinguish one element from another. For example, a first element could be termed a second element, and, similarly, a second element could be termed a first element, without departing from the scope of example embodiments. As used herein the description, the term "and" is used in both the conjunctive and disjunctive sense and includes any and all combinations of one or more of the associated listed items. It will be further understood that the terms "comprises", "comprising", "includes" and "including", when used herein, specify the presence of stated features, integers, steps, operations, elements, and/or components, but do not preclude the presence or addition of one or inure other features, integers, steps, operations, elements, components, and/or groups thereof.

Unless otherwise defined, all terms (including technical and scientific terms) used herein have the same meaning as commonly understood by one of ordinary skill in the art to which example embodiments belong. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
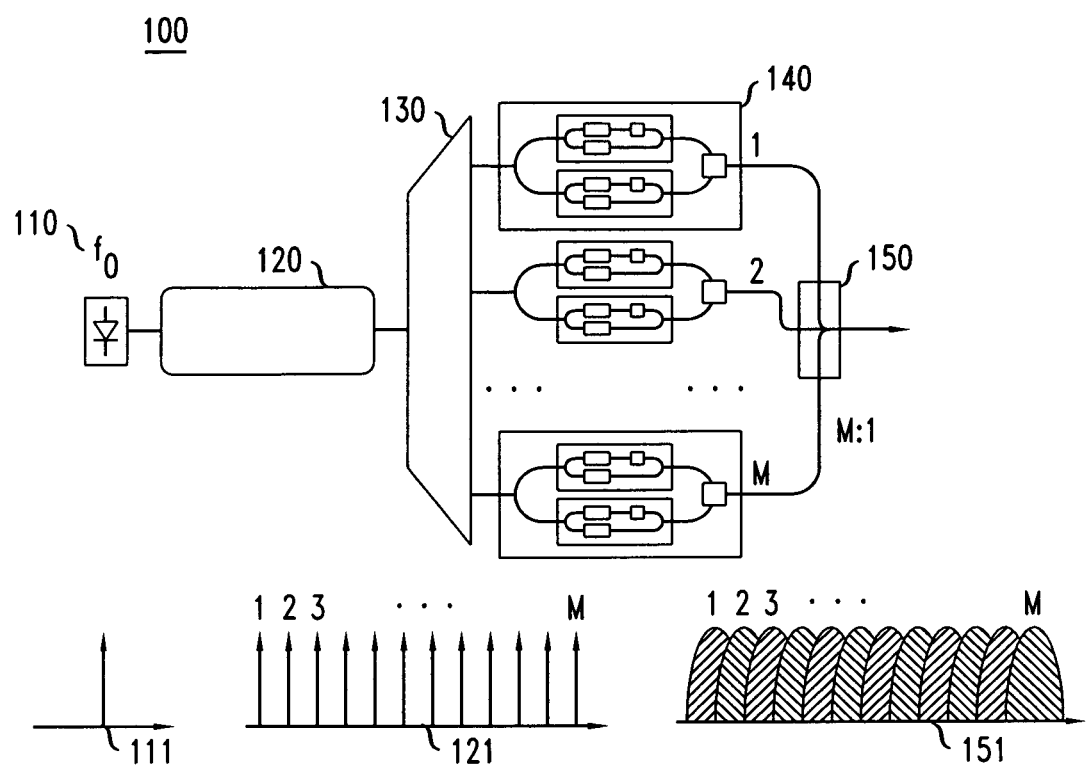
FIG. 1 is a schematic diagram of an exemplary multi-carrier optical transmitter according to the invention and the corresponding signal spectra generated at locations within the exemplary transmitter.

FIG. 1 is a schematic diagram of an exemplary multi-carrier optical transmitter according to the invention and the corresponding signal spectra at locations within the exemplary transmitter. The multi-carrier optical transmitter 100 generates a multi-carrier optical signal that is transmitted to a multi-carrier optical receiver. An exemplary transmitter 100 includes a laser 110 with a frequency of $f_0$. Reference numeral 111 graphically illustrates the optical spectrum of the original carrier at frequency $f_0$. The continuous wave light from the laser 110 is provided to multi-carrier generator 120 which receives the input light and generates M (M>2) frequency-locked optical carriers with a predetermined frequency spacing of $\Delta f$. Reference numeral 121 graphically illustrates M frequency-locked optical carriers The M frequency-locked optical carriers are provided to wavelength demultiplexer 130, which separates the generated multiple frequency-locked optical carriers. Each of the individual carriers is then provided to a corresponding one of a plurality of modulators 140. The modulators synchronously modulate corresponding optical carriers to generate corresponding modulated carriers. "Synchronous" in this context means that each carrier has the same a modulation symbol rate (Rs) and the same time-alignment of modulated symbols. The modulators may be polarization-diversity I/Q modulators driven with any of a variety of modulation schemes such PDM Phase Shift Keying (PSK) and PDM Quadrature Amplitude Modulation (QAM), etc. The modulation symbol rate Rs may be set to be equal to the frequency spacing of $\Delta f$ to form a multi-carrier NGI-CO-OFDM signal.

After modulation, combiner 150 combines the plurality of corresponding modulated carriers into the multi-carrier optical signal having M modulated carriers with time-aligned symbols. Reference numeral 151 graphically illustrates the multi-carrier optical signal having M modulated carriers that is transmitted by the transmitter. The multi-carrier optical signal may be an ultrahigh-speed (e.g., 1-Tb/s) signal.

The multi-carrier optical signal is transmitted to a multi-carrier optical receiver over an optical link (not shown). For example, the optical link may be a long-haul fiber link comprise a number of Erbium-doped fiber amplifiers (EDFA) and a number of fiber spans. The optical link will typically suffer from fiber nonlinearity, self-phase modulation (SPM), chromatic dispersion (CD), and polarization mode dispersion (PMD).

Figure 2:
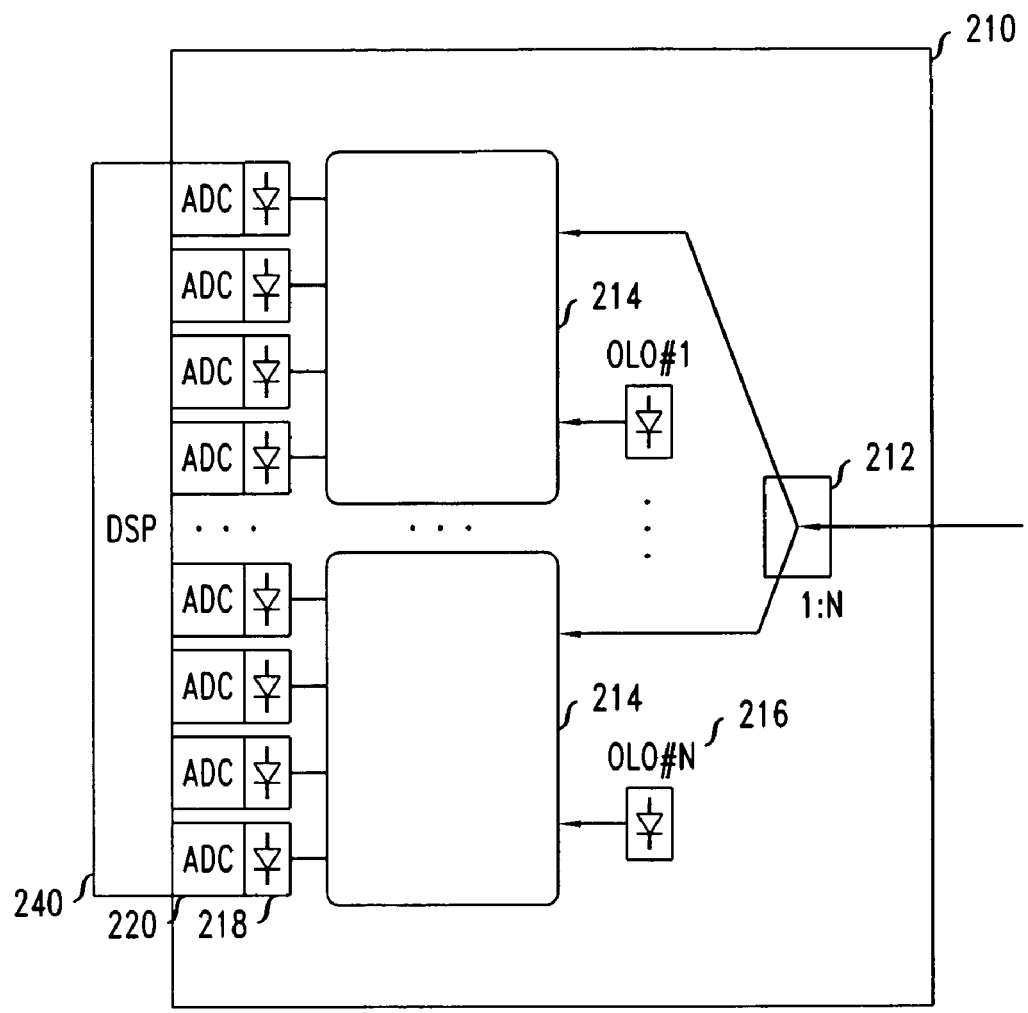
FIG. 2 is schematic diagram of an exemplary multi-carrier coherent optical receiver according to the invention for receiving a multi-carrier optical signal.

FIG. 2 is schematic diagram of an exemplary multi-carrier coherent optical receiver according to the invention for receiving a multi-carrier optical signal. Within an exemplary optical communication system, the multi-carrier coherent optical receiver 200 receives the multi-carrier optical signal after it traverses the optical fiber link. The multi-carrier optical signal received by the multi-carrier coherent optical receiver 200 has M modulated carriers that are frequency locked, wherein M is greater than 2. Each modulated carrier may have a modulation symbol rate of Rs. In one exemplary embodiment, the multi-carrier optical signal is a no-guard-interval coherent optical orthogonal frequency-division multiplexing (NGI-CO-OFDM)

The multi-carrier coherent optical receiver includes a subband digital coherent detector 210 and a digital signal processor (DSP) 240. The subband digital coherent detector obtains the multi-carrier optical signal including a plurality of modulated carriers, each modulated carrier having a modulation symbol rate of Rs and provides output signals in a digital form for N different subbands of the multi-carrier optical signal, where N is an integer greater than 1 and less than M. In one embodiment, the analog-to-digital (ADC) sampling speed of the subband digital coherent detector is approximately (m+1)Rs, m being the number of modulated carriers covered in a corresponding subband of the multi-carrier optical signal. In this manner, a subset of the plurality of modulated carriers covering two or more of the modulated carriers is detected.

The digital signal processor (DSP) processes the digital form of the detected output signals in order to recover the data carried by the modulated carriers corresponding to at least one of the subbands of the multi-carrier optical signal. The DSP processes the modulated carriers of each subset of the multi-carrier optical signal jointly to perform impairment compensation and carrier separation and recovery. In another embodiment, it may be desirable to detect a single subset of the multi-carrier optical signal and process the digital form for the single subset so as to recover data for one or more modulated carriers of that subset.

In the exemplary embodiment of FIG. 2, the subband digital coherent detector obtains a multi-carrier optical signal, which is split by 1:N splitter 112 into a plurality of multi-carrier optical signals. The split multi-carrier optical signals are directed to one of N polarization diversity optical hybrids 214. Each polarization diversity optical hybrid mixes one of the split multi-carrier optical signals with a reference source form a corresponding optical local oscillator (OLO) 216 of N optical local oscillators.

For each subband of the multi-carrier optical signal, the multi-carrier optical signal is mixed with a reference source of an optical local oscillator whose frequency is approximately at the center of that subband to generate a plurality of first output signals. The N optical local oscillators may be equally spaced in frequency; accordingly, the center frequencies of the N subbands of the multi-carrier optical signal are equally spaced. In one embodiment, a subband contains at least two modulated carriers. In another embodiment, all of the subbands of the multi-carrier optical signal do not have an equal number of carriers. For example a first set of subbands may cover three carriers and a second subband set may cover a lesser or greater number of carriers.

A plurality of photodetectors 218 detect output signals of at least one polarization diversity optical hybrid of the N polarization diversity optical hybrids. Each of the polarization diversity optical hybrids has a corresponding plurality of photodetectors that detect output signals from the corresponding hybrid for photodetection of the N subbands of the multi-carrier optical signal. The photodetectors may be balanced detectors, single ended detectors or a combination thereof.

Thereafter, a plurality of analog-to-digital converters (ADC) 220 convert detected output signals from the plurality of photodetectors to digital form. In one embodiment, a plurality of ADC corresponding to a subband have a sampling rate of approximately (m+1)Rs, wherein Rs is a modulation symbol rate of each carrier, and wherein m is the number of modulated carriers covered in the subband of the multi-carrier optical signal. In this context, a modulated carrier centered at frequency $f_i$ is called to be "covered in the subband" when its main spectral content within $[f_i-Rs, f_i+Rs]$ is inside the spectral range of the subband. It is noted that, cased on the above, the larger the number of carriers covered in a subband, the higher the ADC sampling speed needed for a given modulation symbol rate. The optical local oscillator is configured at a different frequency for each subband in order to provide coverage of a portion of the spectrum of the multi-carrier optical signal.

In one embodiment, the DSP 240 is further configured to compensate for transmission impairments for each subband of the multi-carrier optical OFDM signal separately. These transmission impairments may include chromatic dispersion, PMD, and self-phase modulation. Thus, the DSP may include at least one of a dispersion compensation module, a constant modulus algorithm (CMA) based blind equalization module, a self-phase modulation (SPM) compensation module, a carrier separation module, a frequency estimation and compensation module, a phase estimation and compensation module, a demodulation module, and a data recovery module for processing at least one subband of the received multi-carrier optical signal. The processing of a subset of carriers may be performed separately for each of a plurality of subbands. Note that the named modules perform the processing necessary to implement the stated name of the module. For example, the dispersion compensation module performs dispersion compensation on the carriers of the subband being processed, the data recovery module recovers the data carried by the modulated carrier, etc.

Figure 3:
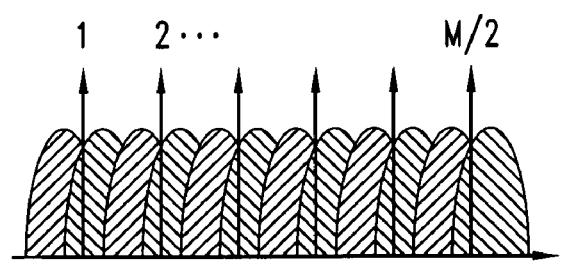
FIGS. 3a-c is graphical illustration of exemplary subband partitioning of a multi-carrier optical signal according to the invention.
Figure 3:
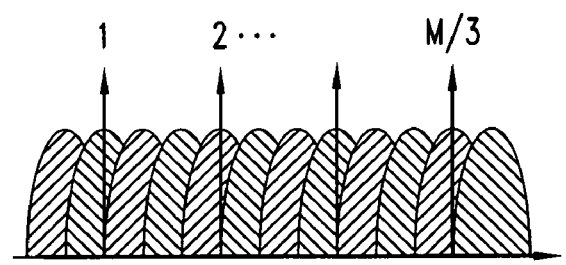
Figure 3:
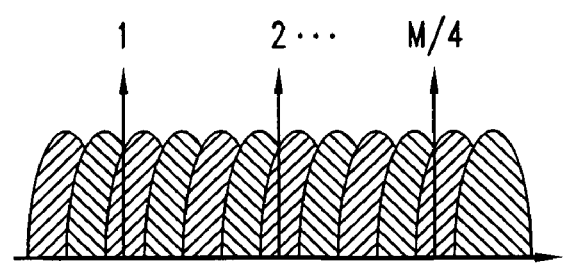

FIG. 3 is graphical illustration of exemplary subband partitioning of a multi-carrier optical signal according to the invention. FIGS. 3*a*-*c* depict exemplary partitioning of the multi-carrier optical signal having M modulated carriers previously illustrated in FIG. 1 by reference numeral 151. M indicates the total number of carriers in the multi-carrier optical signal. N is the total number of subbands and m(i) is the number of carriers covered and to be detected in the i-th subband. The number of carriers to be detected in the i-th subband is (m(i)=m=M/N, and $2 \leq m \leq M/2$). Accordingly, FIG. 3*a* illustrates that the multi-carrier optical signal is to be partitioned such that two carriers (m=2) are to be detected per subband. M/2 subbands will then be required perform this desired partitioning. The number of subbands consequently determines the implementation of the subband digital coherent detector 210. Each subband of the multi-carrier optical signal may have an equal number of modulated carriers as show in FIG. 3*a*. However, partitioning can be undertaken such that each subbands does not cover the same number of carrier.

Likewise, FIG. 3*b* illustrates a partitioning in which three carriers (m=3) are to be covered and detected per subband, and FIG. 3*c* illustrates a partitioning in which three carriers (m=4) are to be covered and detected per subband.

A variety of the functions described above with respect to the exemplary method are readily carried out by special or general purpose digital information processing devices acting under appropriate instructions embodied, e.g., in software, firmware, or hardware programming. For example, functional modules of the DSP and the other logic circuits can be implemented as an ASIC (Application Specific Integrated Circuit) constructed with semiconductor technology and may also be implemented with FPGA (Field Programmable Gate Arrays) or any other hardware blocks.

What is claimed is:

1. An optical communication system comprising
    a multi-carrier coherent optical receiver for receiving a multi-carrier optical signal having M modulated carriers that are frequency locked, wherein M is greater than 2, the multi-carrier coherent optical receiver comprising
        a subband digital coherent detector configured to provide output signals in a digital form for N different subbands of the multi-carrier optical signal, where N is an integer greater than 1 and less than M; and
        a digital signal processor configured to process the digital form of the detected output signals in order to recover the data carried by the modulated carriers corresponding to at least one of the subbands of the multi-carrier optical signal.

2. The optical communication system of claim 1 wherein the multi-carrier optical signal is a no-guard-interval coherent optical orthogonal frequency-division multiplexing (NGI-CO-OFDM) signal.

3. The optical communication system of claim 1 wherein the subband digital coherent detector comprises:
    a 1:N splitter configured to split the multi-carrier optical signal into a plurality of multi-carrier optical signals;
    N optical local oscillators having different wavelengths that are approximately centered at the N different subbands of the multi-carrier optical signal;
    N polarization diversity optical hybrids, each polarization diversity optical hybrid configured to mix one of the split multi-carrier optical signals with a corresponding optical local oscillator of the N optical local oscillators;
    a plurality of photodetectors configured to detect output signals of at least one polarization diversity optical hybrid of the N polarization diversity optical hybrids; and
    a plurality of analog-to-digital converters (ADC) configured to convert detected output signals from the plurality of photodetectors to digital form.

4. The optical communication system of claim 3 wherein the N optical local oscillators are equally spaced in frequency.

5. The optical communication system of claim 1 wherein each of the N subbands covers at least two modulated carriers.

6. The optical communication system of claim 5 wherein each subband of the multi-carrier optical signal covers an equal number of modulated carriers.

7. The optical communication system of claim 2 wherein the photodetectors are balanced detectors, single ended detectors or a combination thereof.

8. The optical communication system of claim 2 wherein a plurality of ADC corresponding to a subband have a sampling rate of approximately (m+1)Rs, wherein Rs is a modulation symbol rate of each carrier, and wherein m is the number of modulated carriers covered in the subband of the multi-carrier optical signal.

9. The optical communication system of claim 1 wherein the DSP is further configured to compensate for transmission impairments for each subband of the multi-carrier optical OFDM signal separately.

10. The optical communication system of claim 1 wherein the digital signal processor comprises at least one of
a dispersion compensation module, a constant modulus algorithm (CMA) based blind equalization module, a self-phase modulation (SPM) compensation module, a carrier separation module, a frequency estimation and compensation module, a phase estimation and compensation module, a demodulation module, and a data recovery module for processing at least one subband of the received multi-carrier optical signal.

11. The optical communication system of claim 1 further comprising:
a multi-carrier optical transmitter for generating the multi-carrier optical signal provided to the multi-carrier optical receiver, the multi-carrier optical transmitter comprising:
a multi-carrier generator configured to receive input light and generate M (M>2) frequency-locked optical carriers;
a wavelength demultiplexer configured to separate the generated multiple frequency-locked optical carriers;
a plurality of modulators configured to synchronously modulate corresponding optical carriers to generate corresponding modulated carriers; and
a combiner configured to combine the plurality of corresponding modulated carriers into the multi-carrier optical signal having M modulated carriers with time-aligned symbols.

12. A method at a receiver, the method comprising:
obtaining a multi-carrier optical signal including M modulated carriers that are frequency locked, wherein M is greater than 2, each modulated carrier having a modulation symbol rate of Rs;
detecting a subset of the plurality of modulated carriers through subband digital coherent detection with analog-to-digital (ADC) sampling speed of approximately (m+1)Rs, m being the number of modulated carriers covered in a corresponding subband of the multi-carrier optical signal, the subset of the plurality of modulated carriers covering two or more of the modulated carriers; and
processing the subset of carriers jointly to perform carrier separation and recovery.

13. The method of claim 12 wherein the multi-carrier optical signal is a no-guard-interval coherent optical orthogonal frequency-division multiplexing (NGI-CO-OFDM) signal.

14. The method of claim 12 wherein detecting a subset of the plurality of modulated carriers comprises:
for the corresponding subband of the multi-carrier optical signal,
mixing the multi-carrier optical signal with a reference source whose frequency is approximately at the center of the corresponding subband to generate a plurality of first output signals;
photodetecting the plurality of first output signals; and
converting the photodetected plurality of first output signals into digital form.

15. The method of claim 14 wherein the detecting is performed for a plurality of subbands of the multi-carrier optical signal, and wherein the optical local oscillator is configured at a different frequency for each subband in order to provide coverage of a portion of the spectrum of the multi-carrier optical signal.

16. The method of claim 12 wherein all of the subbands of the multi-carrier optical signal do not cover an equal number of carriers.

17. The method of claim 12 wherein processing a subset of carriers jointly is performed separately for each of a plurality of subbands.

18. The method of claim 12 wherein processing the subset includes at least one of dispersion compensation, constant modulus algorithm (CMA) based blind equalization, self-phase modulation (SPM) compensation, carrier separation, frequency estimation and compensation, phase estimation and compensation, demodulation, and data recovery.

19. The method of claim 12 wherein the multi-carrier signal is an ultrahigh-speed signal.

20. A method comprising:
detecting m modulated carriers at a time for a multi-carrier optical signal including M modulated carriers, M being an integer value greater than two, each modulated carrier having a modulation symbol rate of Rs, the detecting via subband digital coherent detection with an ADC sampling speed $R_{ADC}$ of approximately (m+1)Rs, m being an integer value greater than or equal to two and less than M; and
performing digital signal processing on the detected m modulated carriers to effect carrier separation and recovery.

* * * * *